United States Patent
Dexheimer

(10) Patent No.: US 6,869,905 B1
(45) Date of Patent: Mar. 22, 2005

(54) SYNTHESIS OF DOUBLE METAL CYANIDES WITH NON-AQUEOUS SOLUTIONS

(75) Inventor: Edward Michael Dexheimer, Grosse Ile, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 10/791,585

(22) Filed: Mar. 2, 2004

(51) Int. Cl.⁷ .......................... B01J 31/00; B01J 31/02; B01J 31/06; B01J 27/26
(52) U.S. Cl. .................. 502/175; 423/351; 423/364; 423/383; 423/367; 423/159
(58) Field of Search .......................... 502/175; 423/351, 423/364, 383, 367, 159

(56) References Cited

U.S. PATENT DOCUMENTS

| | | | |
|---|---|---|---|
| 5,470,813 A | 11/1995 | Le-Khac | |
| 5,714,639 A | 2/1998 | Bowman et al. | |
| 6,436,867 B1 | 8/2002 | Dexheimer et al. | |
| 6,593,268 B2 | 7/2003 | Dexheimer et al. | |

*Primary Examiner*—Elizabeth D. Wood
(74) *Attorney, Agent, or Firm*—Fernando A. Borrego; Howard & Howard Attys

(57) ABSTRACT

An improved method for synthesizing a double metal cyanide (DMC) catalyst includes combining a non-aqueous solution of a first metal salt, such as $ZnBr_2$, with a non-aqueous solution of a second metal salt, such as $CoBr_2$, and with a non-aqueous solution of an alkali metal cyanide, such as NaCN, in a single step to synthesize the DMC catalyst, $Zn_3[Co(CN)_6]_2$.

33 Claims, No Drawings

SYNTHESIS OF DOUBLE METAL CYANIDES WITH NON-AQUEOUS SOLUTIONS

FIELD OF THE INVENTION

The subject invention relates generally to a method of synthesizing a double metal cyanide (DMC) catalyst. More specifically, the method combines a non-aqueous solution of a first metal salt with a non-aqueous solution of a second metal salt and with a non-aqueous solution of an alkali metal cyanide in a single step to synthesize the DMC catalyst.

BACKGROUND OF THE INVENTION

Polyether polyols are integral intermediate components utilized to manufacture a wide array of products, including polyurethanes. As such, the production of polyether polyols is critical. It is known in the art that polyether polyols are produced from the polymerization of epoxides, such as ethylene oxide (EO) and propylene oxide (PO). It is also known in the art that double metal cyanide (DMC) catalysts are effective catalysts for the polymerization of the epoxides. DMC catalysts produce polyether polyols having narrow molecular weight distributions as well as relatively low unsaturation.

In conventional methods, DMC catalysts are synthesized by combining an aqueous solution of a metal salt and an aqueous solution of a complex metal cyanide salt. As a specific example, an aqueous solution of $ZnCl_2$ (excess), as the metal salt, is combined with an aqueous solution of $K_3Co(CN)_6]_2$, as the complex metal cyanide salt. This combination precipitates out the desired DMC catalyst, in this case specifically $Zn_3[Co(CN)_6]_2$. Examples of such conventional methods are disclosed in U.S. Pat. Nos. 5,470,813 and 5,714,639. These conventional methods, in one form or another, utilize a complex metal cyanide salt. The complex metal cyanide salts are very expensive which limits the economic viability of utilizing DMC catalysts in the production of polyether polyols.

In other conventional methods, DMC catalysts are synthesized by combining an aqueous solution of a first metal salt with an aqueous solution of a second metal salt and with an aqueous solution of an alkali metal cyanide in a single step to synthesize the DMC catalyst. Examples of such conventional methods are disclosed in U.S. Pat. Nos. 6,436,867 and 6,593,268. Although such methods do not rely on use of a complex metal cyanide salt, they are remain deficient because the various reagents, i.e., the first metal salt, the second metal salt, and the alkali metal cyanide, are required to be soluble in water. This requirement constrains the choice of reagents and, therefore, the content and morphology of the resulting DMC catalysts. Furthermore, synthesis of DMC catalysts that relies on aqueous solutions results in DMC catalysts that have residual aqueous, i.e., water, based moisture which is detrimental to the DMC catalysts. In other words, such moisture 'poisons' the DMC catalysts. As such, with DMC catalysts synthesized with aqueous solution, further processing (such as stripping, drying, etc.) is required to remove the aqueous-based moisture before these DMC catalysts can be used to polymerize alkylene oxides to produce polyether polyols.

Due to the deficiencies of conventional methods for synthesizing DMC catalysts, including those described above, it would be desirable to provide a method of synthesizing DMC catalysts that does not utilize expensive complex metal cyanide salts as intermediates thereby improving the economic viability of DMC catalysts utilized in the production of polyether polyols. It would also be desirable to provide a method that does not rely on aqueous solutions of the various reagents used during the synthesis of the DMC catalysts such that the content and morphology of the DMC catalysts can be varied and controlled beyond conventional DMC catalysts.

SUMMARY OF THE INVENTION

A method of synthesizing a double metal cyanide (DMC) catalyst is provided. The method of the subject invention, in a single step, combines a non-aqueous solution of a first metal salt of the general formula $M(X)_n$ with a non-aqueous solution of a second metal salt of the general formula $N(Y)_n$ and with a non-aqueous solution of an alkali metal cyanide to synthesize the DMC catalyst.

More specifically, with the non-aqueous solution of the first metal salt, M is selected from the group consisting of aluminum, zinc, and the transition metals; X is an anion selected from the group consisting of halides, hydroxides, sulfates, carbonates, cyanides, oxalates, thiocyanates, isocyanates, isothiocyanates, carboxylates, and nitrates; and n is a value from 1 to 3 satisfying the valency state of M. With the non-aqueous solution of the second metal salt, N is selected from the group consisting of the transition metals and the lanthanides; Y is an anion selected from the group consisting of halides, hydroxides, sulfates, carbonates, cyanides, oxalates, thiocyanates, isocyanates, isothiocyanates, carboxylates, and nitrates; and n is a value from 1 to 3 satisfying the valency state of N.

Accordingly, the method of synthesizing the DMC catalyst according to the subject invention does not utilize complex metal cyanide salts. Additionally, this method does not rely on aqueous solutions for the various reagents, i.e., the first metal salt, the second metal salt, and the alkali metal cyanide. Instead, during synthesis, this method relies on non-aqueous solutions for these reagents. Thus, the water solubility is not pertinent and different reagents can be selected for synthesizing the DMC catalysts. With the different reagents, the content and morphology of the DMC catalysts can be varied and controlled. Furthermore, further processing of the DMC catalysts synthesized herein prior to use in producing polyether polyols is not required because the DMC catalysts synthesized according to this invention are free of aqueous-based moisture.

DETAILED DESCRIPTION OF A PREFERRED EMBODIMENT

A method of synthesizing a double metal cyanide (DMC) catalyst is disclosed. The method of the subject invention synthesizes the DMC catalyst by combining non-aqueous solutions of a first metal salt, a second metal salt, and an alkali metal cyanide in a single step to synthesize the catalyst. The first metal salt, the second metal salt, and the alkali metal cyanide are also referred to throughout as 'the reagents'.

A non-aqueous solution of the first metal salt is prepared. The non-aqueous solution of the first metal salt can range from 0.1 to 50, more preferably from 0.5 to 10, parts by weight of the first metal salt based on 100 parts by weight of the non-aqueous solution. Similarly, the non-aqueous solution of the second metal salt and the non-aqueous solution of the alkali metal cyanide are also prepared. Like the non-aqueous solution of the first metal salt, the non-aqueous solutions for the second metal salt and for the alkali metal cyanide can also range from 0.1 to 50, more preferably from 0.5 to 10, parts by weight of the second metal salt and the alkali metal cyanide, respectively, based on 100 parts by weight of the non-aqueous solution. Despite the respective concentrations in each non-aqueous solution, upon combining, the first metal salt is preferably combined in molar excess relative to the second metal salt. The molar ratio of the first metal salt to the second metal salt is described additionally below in the Example.

The first metal salt is more specifically of the general formula $M(X)_n$. In this formula, it is to be understood that M is selected from the group consisting of aluminum, zinc, and the transition metals, X is an anion selected from the group consisting of halides, hydroxides, sulfates, carbonates, cyanides, oxalates, thiocyanates, isocyanates, isothiocyanates, carboxylates, and nitrates, and n is a value from 1 to 3 satisfying the valency state of M. In one preferred embodiment of the subject invention, M is selected from the group consisting of Al(III) and Zn(II), X is an anion selected from the group consisting of halides and acetate, and n is a value from 1 to 3 satisfying the valency state of M. Most preferably, the first metal salt of the subject invention is $ZnI_2$, $ZnBr_2$, or $Zn(OAc)_2$.

The second metal salt is more specifically of the general formula $N(Y)_n$. In this formula, it is to be understood that N is selected from the group consisting of the transition metals and the lanthanides, Y is an anion selected from the group consisting of halides, hydroxides, sulfates, carbonates, cyanides, oxalates, thiocyanates, isocyanates, isothiocyanates, carboxylates, and nitrates, and n is a value from 1 to 3 satisfying the valency state of N. In one preferred embodiment of the subject invention, N is selected from the group consisting of the Fe(II), Fe(III), Co(II), Co(III), and Nd(III), Y is an anion selected from the group consisting of halides, and n is a value from 1 to 3 satisfying the valency state of N. More preferably, the second metal salt of the subject invention is $CoCl_2$ and, most preferably, the second metal salt is $CoBr_2$.

Group IA alkali metals may be utilized for the alkali metal cyanide of the subject invention. Preferably, the alkali metal cyanide utilized is KCN, LiCN, or NaCN. However, other alkali metal cyanides may be utilized without varying the scope of the subject invention. The most preferred alkali metal cyanide in a non-aqueous solution is NaCN.

The non-aqueous solutions of the first metal salt, the second metal salt, and the alkali metal cyanide include the first metal salt, the second metal salt, and the alkali metal cyanide, respectively, dissolved in a non-aqueous solvent selected from the group of polar protic solvents, dipolar aprotic solvents, and combinations thereof. For instance, the non-aqueous solution of the first metal salt includes the first metal salt and the non-aqueous solvent, and this non-aqueous solvent can be a polar protic solvent, a dipolar aprotic solvent, a combination of a polar protic solvent and a dipolar aprotic solvent, or a combination of polar protic solvents and/or dipolar aprotic solvents. The same is true for the non-aqueous solutions of the second metal salt and the alkali metal cyanide.

The non-aqueous solvent is anhydrous, i.e., free of water, and fulfills various functions during the synthesis of the DMC catalyst. The non-aqueous solvent solvates the reagents. As such, each reagent is dissolved and this facilitates necessary collisions between the reagents that must occur to appropriately synthesize the DMC catalyst. The non-aqueous solvent may also function to control temperature during the synthesis of the DMC catalyst. Preferably, the non-aqueous solvent is inert, i.e., does not react, during the synthesis.

As is understood by those skilled in the art, polar protic solvents and dipolar aprotic solvents are generally distinguishable by their respective polarities. To this end, a polar protic solvent typically includes a hydrogen atom attached to an electronegative atom, which is generally oxygen, but can also be other atoms including, but not limited to, nitrogen and sulfur. When the electronegative atom is oxygen, a typical polar protic solvent is a compound that can be represented by the general formula R—O—H. The general formula R—O—H is not to be interpreted to be limited to an alcohol though these may be most economical. For instance, when the electronegative atom is oxygen, acetic acid falls within the general formula R—O—H, where R =an acetyl group. The polarity of a polar protic solvent is due to the O—H bond, more specifically due to a bond dipole of the O—H bond. The O—H bond has a bond dipole because there is a large difference in electronegativities of the oxygen atom and the hydrogen atom and also because the hydrogen atom is small relative to the oxygen atom.

Examples of various polar protic solvents suitable for use in the method of the present invention include, but are not limited to, alkanols, carboxylic acids, and combinations thereof. Although not necessarily required, it is preferred that the alkanols are selected from the group consisting of methanol, ethanol, propanols, butanols, and combinations thereof. By the plural form of propanols and butanols, it is meant to include the various isomers of propanol and butanol. One non-limiting example of a suitable carboxylic acid is acetic acid. Methanol, which is a polar protic solvent, is the most preferred non-aqueous solvent in the method of the present invention. As such, it is most preferred that the first metal salt, the second metal salt, and the alkali metal cyanide are all dissolved in methanol.

A dipolar aprotic solvent is a type of solvent that is incapable of donating or accepting protons. Unlike polar protic solvents, dipolar aprotic solvents do not contain an O—H bond. Dipolar aprotic solvents all contain a bond that has a large bond dipole, which is typically a multiple bond between a carbon atom and either an oxygen, nitrogen, or sulfur atom. Most dipolar aprotic solvents contain a double bond between a carbon atom and an oxygen atom. Examples of various dipolar aprotic solvents suitable for use in the method of the present invention include, but are not limited to, ketones (such as acetone, methyl ethyl ketone, and methyl isobutyl ketone), alkyl acetates (such as ethyl acetate), nitriles (such as acetonitrile), formamides (such as dimethylformamide), sulfoxides (such as dimethyl sulfoxide), N-alkylpyrrolidinones (such as N-methylpyrrolidone), and combinations thereof.

During combining, all three non-aqueous solutions of the first metal salt, of the second metal salt, and of the alkali metal cyanide can be combined in the single step via three, separate feed streams into a reactor, which is originally empty. That is, each specific non-aqueous solution can be independently fed into the reactor. Alternatively, during combining, the non-aqueous solution of the first metal salt and the non-aqueous solution of the second metal salt, although separate, can each be simultaneously fed into the reactor, which originally contains the non-aqueous solution of the alkali metal cyanide.

In one particular embodiment of the present invention, a preferred embodiment, the method of the subject invention first combines the non-aqueous solution of $M(X)_n$ and the non-aqueous solution of $N(Y)_n$ to establish a first non-aqueous solution. The first non-aqueous solution, which includes the non-aqueous solutions of both the first metal salt, $M(X)_n$, and the second metal salt, $N(Y)_n$, is then combined with the non-aqueous solution of the alkali metal cyanide, such as a non-aqueous solution of KCN or NaCN, to form the DMC catalyst. As the first non-aqueous solution is being combined with the non-aqueous solution of the alkali metal cyanide, the non-aqueous solution of the alkali metal cyanide is preferably being agitated via mechanical stirring. Combination of the first non-aqueous solution with the non-aqueous solution of the alkali metal cyanide is still considered a single step within the method of the present invention because, although the non-aqueous solution of the first metal salt, $M(X)_n$, is first added along with the non-aqueous solution of the second metal salt, $N(Y)_n$, to establish the first non-aqueous solution, there is no reaction between the first metal salt and the second metal salt in the first non-aqueous solution. Thus, in this particular embodiment, the separate establishment of the first non-aqueous solution is not a distinct step.

The step of combining according to the method of the present invention forms a suspension having a continuous phase and a particle phase. The particle phase is dispersed throughout the continuous phase and this particle phase includes the DMC catalyst synthesized from the combination of the non-aqueous solutions of the first metal salt, the second metal salt, and the alkali metal cyanide. The continuous phase includes a secondary product, i.e., part or all of the byproduct salt.

The suspension may be further processed to separate the particle phase from the continuous phase. The most preferred manner in which to separate the particle phase from the continuous phase is to filter the suspension to collect the particle phase, which as set forth above, includes the DMC catalyst, as a retentate. Prior to filtering the suspension, the suspension may, optionally, be held until the particle phase at least partially separates from the continuous phase. If the suspension is held, it is preferably held for from 0.5 to 24 hours. If the particle phase is suitably separated from the continuous phase, then the continuous phase can simply be decanted. Centrifugation of the suspension may even be utilized to enhance separation.

Regardless of whether the suspension is held, simply decanted, or subject to centrifuge, the suspension is preferably filtered via any method that would be known to a person of ordinary skill in the art. As non-limiting examples, the suspension may be filtered by processing through a coarse glass frit (for lab scale purposes) or may be filtered by processing through some form of an industrial filter (for industrial-scale manufacturing purposes) to collect the retentate. Once the retentate is collected, the step of separating the particle phase from the continuous phase continues by drying the retentate, either by simple air-drying or by vacuum-drying.

The following Example illustrates the nature of the subject method invention with regard to the synthesis of the DMC catalyst. The Example presented herein is intended to illustrate, and not to limit, the subject invention.

EXAMPLE

The method synthesizes the DMC catalyst in a single step according to the following general chemical equation:

$$3ZnBr_2 + 2CoBr_2 + 12NaCN \rightarrow Zn_3[Co(CN)_6]_2$$

The non-aqueous solution of the first metal salt, $ZnBr_2$, was combined with the non-aqueous solution of the second metal salt, $CoBr_2$, and with the non-aqueous solution of the alkali metal cyanide, NaCN, in a single step to synthesize the DMC catalyst, $Zn_3[Co(CN)_6]_2$.

More specifically, to prepare the non-aqueous solution of the alkali metal cyanide, 14.70 grams of NaCN (0.30 moles) and 31 of absolute methanol were added in a 51 reaction flask. The reaction flask was equipped with mechanical stirring and a thermocouple probe. To prepare the non-aqueous solution of the first metal salt, 300 ml of absolute methanol were added to 33.78 grams of anhydrous $ZnBr_2$ (0.15 moles). To prepare the non-aqueous solution of the second metal salt, 200 ml of absolute methanol were added to 10.94 grams of anhydrous $CoBr_2$ (0.05 moles). 200 ml of the non-aqueous solution of $ZnBr_2$ and 200 ml of the non-aqueous solution of $CoBr_2$ were combined into an addition funnel thereby establishing 400 ml of a first non-aqueous solution.

Under rapid stirring, the first non-aqueous solution was added dropwise into the non-aqueous solution of the NaCN. After 50 minutes, 250 ml of the 400 ml first non-aqueous solution had been added with the temperature rising from 24 to 26° C. Over the next 50 minutes, the remaining 150 ml of the first non-aqueous solution were added into the non-aqueous solution of the NaCN. The temperature remained at 26° C. After the 150 ml of the first non-aqueous solution were added, the remaining 100 ml of the non-aqueous solution of $ZnBr_2$ were added dropwise over 45 minutes and the temperature remained at 26° C.

A suspension was formed with the suspension having a continuous phase and a particle phase dispersed throughout the continuous phase wherein the particle phase included the DMC catalyst, $Zn_3[Co(CN)_6]_2$, synthesized from the combination of the non-aqueous solutions of $ZnBr_2$, $CoBr_2$, and NaCN. The continuous phase of the suspension included a secondary product which, in this Example, was specifically NaBr. Although not included in the general chemical equation detailed above, NaBr is produced as the secondary product according to the above chemical equation. It is understood that NaBr may deactivate the DMC catalyst such that the DMC catalyst is ineffective in polymerizing epoxides, such as PO, to produce a polyether polyol. As such, it is important that any amounts of the secondary product NaBr are minimized, if not completely eliminated, through the step of separating the particle phase from the continuous phase.

After holding the formed suspension, the particle phase partially separated from the continuous phase. More specifically, the continuous phase formed an upper layer of the suspension and the particle phase was concentrated in a lower layer of the suspension. The upper layer was decanted through a coarse glass frit. The remaining lower layer was filtered through the coarse glass frit at approximately 500 mm Hg vacuum. A first filtrate and a first retentate were established. The first retentate, which was a paste-like substance, remained on the coarse glass frit, and the first filtrate was transferred to a 1 gallon vessel. The first retentate was then transferred to a 1.5 l beaker, which contained a magnetic stirring element. The volume of the first retentate in the beaker was approximately 200 ml. 800 ml of absolute methanol was added to the beaker thereby forming a first dispersion, including the methanol and the first retentate. The first dispersion was rapidly stirred with the magnetic stirring element for 90 minutes, and then the first dispersion was filtered through a coarse glass frit under 400 to 500 mm Hg vacuum thereby establishing a second filtrate and a second retentate.

The second retentate was transferred to a different 1.5 l beaker which, like the beaker above, contained a magnetic stirring element. 800 ml of absolute methanol was added to this beaker thereby forming a second dispersion, including the methanol and the second retentate. The second dispersion was rapidly stirred with the magnetic stirring element for 60 minutes, and then the second dispersion was filtered through a coarse glass frit under 400 to 500 mm Hg vacuum thereby establishing a third filtrate and a third retentate.

A 100 ml aliquot of the second filtrate was evaporated to dryness leaving 0.3 grams of a white, water-soluble residue, and a 100 ml aliquot of the third filtrate was evaporated to dryness leaving only 0.09 grams of the white, water-soluble residue. The white, watersoluble residue was the secondary product NaBr. The lessening amount of the NaBr from the second filtrate to the third filtrate indicates that the repeated addition of 800 ml of absolute methanol to the second and third filtrates was effectively eliminating any unwanted secondary product and was effectively isolating the DMC catalyst due to the continued separation of the particle phase from the secondary product, NaBr.

The remaining amount of the third retentate was transferred to a crystallizing dish and placed in a vacuum dessicator. A heat lamp was placed so the lamp would emit its energy on the third retentate, and the dessicator was evacuated overnight at 9 mm Hg. Next, the third retentate, now dry, was ground with a mortar and pestle to a tan, extremely light powder weighing 20.27 grams. This tan, extremely light powder was the DMC catalyst, $Zn_3[Co(CN)_6]_2$.

The invention has been described in an illustrative manner, and it is to be understood that the terminology which has been used is intended to be in the nature of words of description rather than of limitation. Obviously, many modifications and variations of the present invention are possible in view of the above teachings. It is, therefore, to be understood that within the scope of the claims the invention may be practiced otherwise than as specifically described.

What is claimed is:

1. A method of synthesizing a double metal cyanide (DMC) catalyst, said method comprising the step of:
   combining a non-aqueous solution of a first metal salt of the general formula $M(X)_n$ wherein;
      M is selected from the group consisting of aluminum, zinc, and the transition metals,
      X is an anion selected from the group consisting of halides, hydroxides, sulfates, carbonates, cyanides, oxalates, thiocyanates, isocyanates, isothiocyanates, carboxylates, and nitrates, and
      n is a value from 1 to 3 satisfying the valency state of M;
   with a non-aqueous solution of a second metal salt of the general formula $N(Y)_n$ wherein;
      N is selected from the group consisting of the transition metals and the lanthanides,
      Y is an anion selected from the group consisting of halides, hydroxides, sulfates, carbonates, cyanides, oxalates, thiocyanates, isocyanates, isothiocyanatcs, carboxylates, and nitrates, and
      n is a value from 1 to 3 satisfying the valency state of N; and with a non-aqueous solution of an alkali metal cyanide in a single step to synthesize the DMC catalyst.

2. A method as set forth in claim 1 wherein the non-aqueous solutions of the first metal salt, the second metal salt, and the alkali metal cyanide comprise the first metal salt, the second metal salt, and the alkali metal cyanide, respectively, dissolved in a non-aqueous solvent selected from the group of polar protic solvents, dipolar aprotic solvents, and combinations thereof.

3. A method as set forth in claim 2 wherein the polar protic solvents are selected from the group consisting of alkanols, carboxylic acids, and combinations thereof.

4. A method as set forth in claim 3 wherein the alkanols are selected from the group consisting of methanol, ethanol, propanols, butanols, and combinations thereof.

5. A method as set forth in claim 2 wherein the dipolar aprotic solvents are selected from the group consisting of ketones, alkyl acetates, nitriles, formamides, sulfoxides, N-alkylpyrrolidinones, and combinations thereof.

6. A method as set forth in claim 1 wherein the non-aqueous solutions of the first metal salt, the second metal salt, and the alkali metal cyanide comprise the first metal salt, the second metal salt, and the alkali metal cyanide, respectively, dissolved in methanol.

7. A method as set forth in 1 wherein the alkali metal cyanide is selected from the group consisting of KCN, LiCN, and NaCN.

8. A method as set forth in claim 1 wherein the step of combining is further defined by first combining the non-aqueous solution of $M(X)_n$ with the non-aqueous solution of $N(Y)_n$ to establish a first non-aqueous solution.

9. A method as set forth in claim 8 wherein the step of combining is further defined by combining the first non-aqueous solution with the non-aqueous solution of the alkali metal cyanide.

10. A method as set forth in claim 1 wherein the step of combining forms a suspension having a continuous phase and a particle phase dispersed throughout the continuous phase wherein the particle phase comprises the DMC catalyst synthesized from the combination of the non-aqueous solutions of the first metal salt, the second metal salt, and the alkali metal cyanide, and the continuous phase comprises a secondary product.

11. A method as set forth in claim 10 further comprising the step of separating the particle phase from the continuous phase.

12. A method as set forth in claim 11 wherein the step of separating the particle phase from the continuous phase comprises the step of filtering the suspension to collect the particle phase comprising the DMC catalyst as a retentate.

13. A method as set forth in claim 12 wherein the step of separating the particle phase from the continuous phase further comprises the step of drying the retentate.

14. A method as set forth in claim 11 wherein the step of separating the particle phase from the continuous phase comprises the step of holding the suspension until the particle phase at least partially separates from the continuous phase.

15. A method as set forth in claim 14 wherein the step of separating the particle phase from the continuous phase further comprises the step of decanting the continuous phase after the suspension has been held.

16. A method as set forth in claim 1 wherein the first metal salt is combined in molar excess relative to the second metal salt.

17. A method as set forth in claim 1 wherein the non-aqueous solutions of the first metal salt, the second metal salt, and the alkali metal cyanide each include from 0.1 to 50 parts by weight of the first metal salt, the second metal salt, and the alkali metal cyanide, respectively, based on 100 parts by weight of the non-aqueous solution.

18. A method of synthesizing a double metal cyanide (DMC) catalyst, said method comprising the step of:
   combining a non-aqueous solution of a first metal salt of the general formula $M(X)_n$ wherein;
      M is selected from the group consisting of Al(III) and Zn(II),
      X is an anion selected from the group consisting of halides and acetate, and n is a value from 1 to 3 satisfying the valency state of M;

with a non-aqueous solution of a second metal salt of the general formula $N(Y)_n$ wherein;

N is selected from the group consisting of the Fe(II), Fe(III), Co(II), Co(III), and Nd(III), Y is an anion selected from the group consisting of halides, and n is a value from 1 to 3 satisfying the valency state of N; and with a non-aqueous solution of an alkali metal cyanide in a single step to synthesize the DMC catalyst.

19. A method as set forth in claim 18 wherein the non-aqueous solutions of the first metal salt, the second metal salt, and the alkali metal cyanide comprise the first metal salt, the second metal salt, and the alkali metal cyanide, respectively, dissolved in a non-aqueous solvent selected from the group of polar protic solvents, dipolar aprotic solvents, and combinations thereof.

20. A method as set forth in claim 19 wherein the polar protic solvents are selected from the group consisting of alkanols, carboxylic acids, and combinations thereof.

21. A method as set forth in claim 20 wherein the alkanols are selected from the group consisting of methanol, ethanol, propanols, butanols, and combinations thereof.

22. A method as set forth in claim 19 wherein the dipolar aprotic solvents are selected from the group consisting of ketones, alkyl acetates, nitriles, formamides, sulfoxides, N-alkylpyrrolidinones, and combinations thereof.

23. A method as set forth in claim 18 wherein the non-aqueous solutions of the first metal salt, the second metal salt, and the alkali metal cyanide comprise the first metal salt, the second metal salt, and the alkali metal cyanide, respectively, dissolved in methanol.

24. A method as set forth in 18 wherein the alkali metal cyanide is selected from the group consisting of KCN, LiCN, and NaCN.

25. A method as set forth in claim 18 wherein the step of combining forms a suspension having a continuous phase and a particle phase dispersed throughout the continuous phase wherein the particle phase comprises the DMC catalyst synthesized from the combination of the non-aqueous solutions of the first metal salt, the second metal salt, and the alkali metal cyanide, and the continuous phase comprises a secondary product.

26. A method as set forth in claim 25 further comprising the step of separating the particle phase from the continuous phase.

27. A method as set forth in claim 26 wherein the step of separating the particle phase from the continuous phase comprises the step of filtering the suspension to collect the particle phase comprising the DMC catalyst as a retentate.

28. A method of synthesizing a double metal cyanide (DMC) catalyst, said method comprising the step of:

combining a non-aqueous solution of $ZnI_2$;

with a non-aqueous solution of $CoCl_2$; and with a non-aqueous solution of KCN in a single step to synthesize the DMC catalyst.

29. A method as set forth in claim 28 wherein the non-aqueous solutions of $ZnI_2$, $CoCl_2$, and KCN comprise $ZnI_2$, $CoCl_2$, and KCN, respectively, dissolved in a non-aqueous solvent selected from the group of polar protic solvents, dipolar aprotic solvents, and combinations thereof.

30. A method as set forth in claim 29 wherein the non-aqueous solvent is methanol.

31. A method of synthesizing a double metal cyanide (DMC) catalyst, said method comprising the step of:

combining a non-aqueous solution of $ZnBr_2$;

with a non-aqueous solution of $CoBr_2$; and with a non-aqueous solution of NaCN in a single step to synthesize the DMC catalyst.

32. A method as set forth in claim 31 wherein the non-aqueous solutions of $ZnBr_2$, $CoBr_2$, and NaCN comprise $ZnBr_2$, $CoBr_2$, and NaCN, respectively, dissolved in a non-aqueous solvent selected from the group of polar protic solvents, dipolar aprotic solvents, and combinations thereof.

33. A method as set forth in claim 32 wherein the non-aqueous solvent is methanol.

\* \* \* \* \*